United States Patent [19]

Enomoto et al.

[11] Patent Number: 5,012,693

[45] Date of Patent: May 7, 1991

[54] DRIVE MECHANISM FOR REAR-VIEW MIRROR ASSEMBLY OF MOTOR-DRIVEN FOLDING TYPE

[75] Inventors: Masao Enomoto, Hadano; Masami Yamamoto, Machida; Yoshiro Nagayama; Yoshinori Yamauchi, both of Isehara, all of Japan

[73] Assignee: Ichikoh Industries, Ltd., Tokyo, Japan

[21] Appl. No.: 381,415

[22] PCT Filed: Aug. 19, 1988

[86] PCT No.: PCT/JP88/00827

§ 371 Date: May 25, 1989

§ 102(e) Date: May 25, 1989

[87] PCT Pub. No.: WO89/01427

PCT Pub. Date: Feb. 23, 1989

[30] Foreign Application Priority Data

Aug. 20, 1987 [JP] Japan .................................. 62-125652
Jun. 30, 1988 [JP] Japan .................................. 63-85770
Jun. 30, 1988 [JP] Japan .................................. 63-85771

[51] Int. Cl.[5] ............................. F16C 1/10; G02B 7/18
[52] U.S. Cl. ..................................... 74/502.1; 350/636; 350/637; 74/479
[58] Field of Search ............... 74/502.1, 479, 424.8 R; 350/636, 637, 633, 634, 531; 248/487

[56] References Cited

U.S. PATENT DOCUMENTS 4,050,776 9/1977 Hsu ........................................ 350/636
4,158,483 6/1979 Fisher et al. ......................... 74/502.1
4,540,252 9/1985 Hayashi et al. ..................... 74/479 X
4,832,477 5/1989 Torii et al. ........................... 350/637

FOREIGN PATENT DOCUMENTS 2413240 7/1979 France ................................ 350/636
56-39343 4/1981 Japan ................................ 74/502.1
0040802 4/1981 Japan ................................ 350/636
62-77256 4/1987 Japan ................................ 74/502.1

Primary Examiner—Vinh T. Luong
Attorney, Agent, or Firm—Foley & Lardner, Schwartz, Jeffery, Schwaab, Mack, Blumenthal & Evans

[57] ABSTRACT

A drive mechanism for an automatic rear-view mirror assembly of a motor-driven folding type. The driving mechanism includes an electric motor fixed on a mirror housing. The mirror housing is supported rotatably on a shaft fixed to a mirror base which is secured to a vehicle body in such a manner that it can be turned between a normal and retracted position by the drive mechanism. The drive mechanism includes a motor and a gear reducer composed of a plurality of planetary gear units. The planetary gear units include a sun gear connected to an output of the motor, and a group of transmission gears including a first spur gear mounted fixedly on the shaft and a second spur gear connected to an output shaft and meshed with the first spur gear. The reduction gear includes a first casing which houses the planetary gear units on the same shaft and has a ring gear common to these planetary gear units, provided on its inner circumferential surface. The reduction gear also includes a second casing which houses the remaining planetary gear units on the same shaft as the planetary gear units of the first unit, so that the planetary gear units of both casings are meshed with each other. The second casing also has a ring gear on its inner circumferential surface and a bolt by which the first and second casings are combined unitarily with each other. The ring gears of the first and second casings are formed with different gear modules, with the ring gear of the first casing being formed with a smaller gear module than that of the ring gear in the second casing.

12 Claims, 5 Drawing Sheets

DRIVE MECHANISM FOR REAR-VIEW MIRROR ASSEMBLY OF MOTOR-DRIVEN FOLDING TYPE

BACKGROUND OF THE INVENTION

1. Field of the Invention

The present invention relates to a drive mechanism for use in an automotive side-view mirror assembly of a motor-driven folding type, and more particularly to a drive mechanism destined for use in such a mirror assembly to pivot in relation to the mirror base which is to be fixed to a car body the mirror housing supporting the mirror in such a manner that the latter can be turned vertically and horizontally, thereby folding the mirror to the folded position or returning to the normal position.

2. Prior Art

The drive mechanism for an automotive side-view mirror assembly of a motor-driven folding type comprises an electric motor fixed in a mirror housing, a speed reducer including reduction gears to reduce the revolution of the motor, and a device to convert the revolution output of the speed reducer into a revolution of the mirror housing itself. Normally, remote-controlled mirror assemblies have disposed in the mirror housing thereof a drive unit to turn the mirror itself vertically and horizontally. Thus, the drive unit comprising a drive motor, speed reducer and converter is to be disposed in a limited space in the mirror housing.

The speed reducer forming a part of the drive unit used in such automotive side-view mirror of a motor-driven folding type is a relatively compact, lightweight one which uses planet gears in order to achieve a high reduction ratio. However, a single-stage speed reduction by a single planet gear cannot provide a desired reduction ratio. Normally, a multi-stage planet gear unit is used in the form of a plurality of planetary gear units housed in an elongated cylindrical casing having common ring gears formed on the inner wall thereof. More particularly, the required sizes of the ring gears, sun gears, planet gears and planet carriers in the multi-stage planetary gear unit disposed in the limited space in the mirror housing are extremely small. Therefore, the manual assembling of the planetary gear units one by one into the elongated casing is very complicated and requires at the present great skill, much time and labor.

SUMMARY OF THE INVENTION

It is therefore an object of the present invention to provide a drive mechanism for a rear-view mirror of a motor-driven folding type using planet gears which can be easily assembled without any great skill.

The above object is attained by providing a drive mechanism for a side-view mirror of a motor-driven folding type, comprising, according to the present invention, an electric motor capable of pivoting between the normal position and the folded position, a mirror housing pivotably supported on a shaft fixed to a mirror base which is to be fixed to a car body, a speed reducer comprising a plurality of planetary gear units including a sun gear coupled to an output shaft of the motor, and a transmission gear group including at least a spur gear fixed on the shaft and another spur gear coupled to the output shaft of the speed reducer and which is in mesh with the first spur gear, the speed reducer comprising a first cylindrical casing housing positioned coaxially with some of the plurality of planetary gear units and which has formed on the inner circumferential wall thereof a ring gear common to the above-mentioned planetary gear units, a second cylindrical casing housing positioned coaxially with the remaining planetary gear units among the plurality of planetary gear units so as to be in mesh with the above-mentioned planetary gear units and has formed on the inner circumferential face thereof a ring gear common to the remaining planetary gear units, and a means for coupling together the first and second casings.

Since the casing assembly housing the plurality of planetary gear units composing the speed reducer is of a longitudinally split structure, namely, it is composed of the first and second casings, some of the planetary gear units can be housed in the first casing while the remaining planetary gear units be housed in the second casing. Thus, the drive mechanism according to the present invention can be very easily assembled without any great skill.

Also, because of the split structure of the casing assembly, a material and module can be freely selected for each of the planetary gear units housed in the first and second casings, and thus the gear rigidity can be designed more freely. More particularly, for planetary gear units at the side of a motor of a low load torque, a material and module can be selected without the necessity of taking into consideration the large torque of the planetary gear units at the output side. Therefore, since the module of the ring gear for the motor-side planetary gear units can be kept to a small design, a higher reduction ratio can be provided and the casing housing the motor-side planetary gear units can be made from a synthetic resin.

Furthermore, the first and second casings can be connected to each other by a faucet joint. Thus, during assembling of the drive mechanism into the mirror assembly, the first and second casings can be held concentrically with each other with the planetary gear units housed therein, respectively, and the gears can be put into mesh with each other with the casings being turned with respect to each other.

DETAILED DESCRIPTION OF THE PREFERRED EMBODIMENTS

The present invention will be hereinafter explained by way of example, with reference to the attached drawings.

Figure 1:
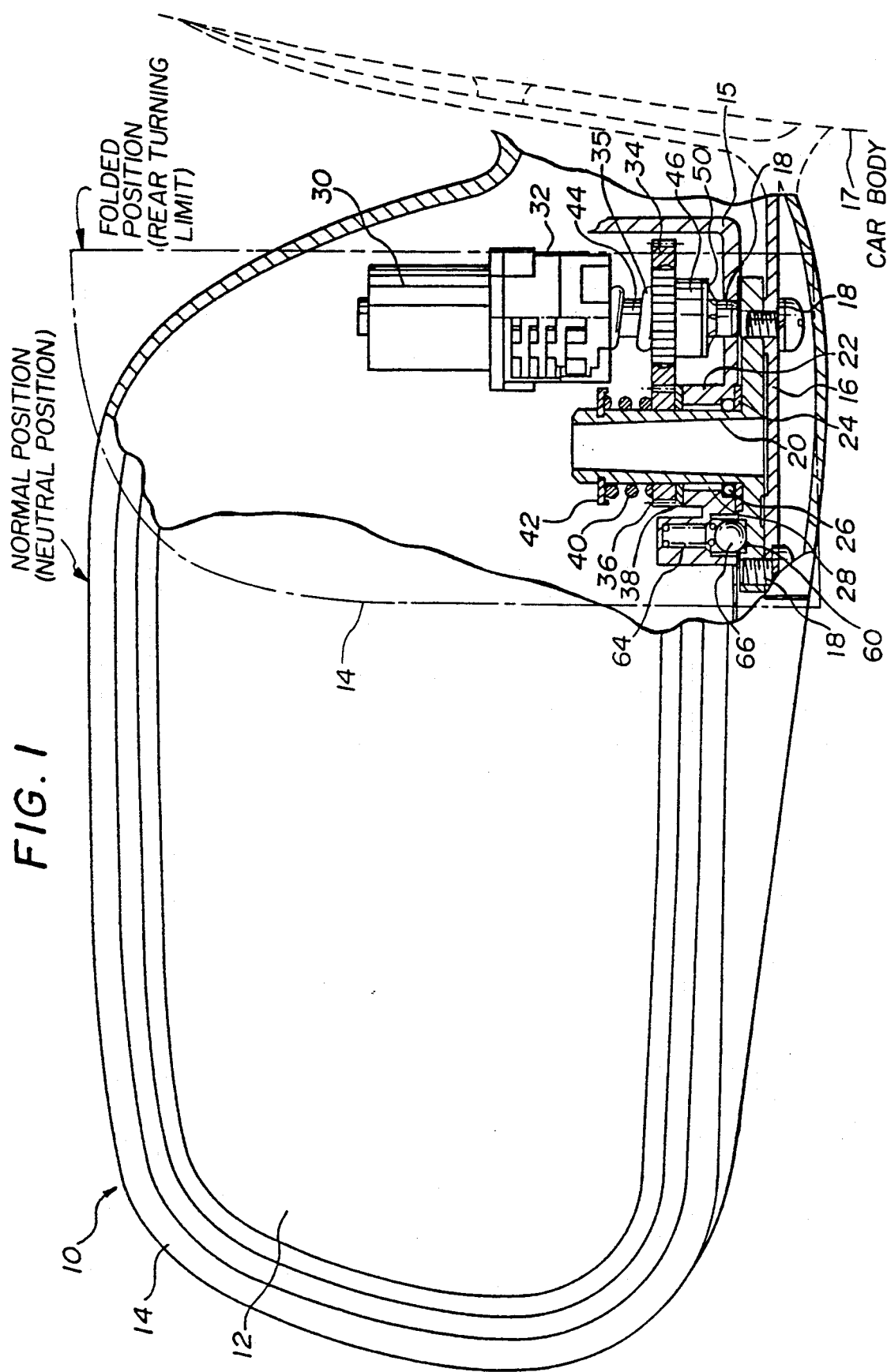
FIG. 1 is a front view of a motor-driven folding type rear-view mirror assembly according to an embodiment of the present invention, showing the internal structure with the mirror surface partially fragmented.

FIGS. 1 thru 4 show an embodiment of the drive unit according to the present invention. In FIG. 1, the entire motor-driven folding type side-view mirror is indicated with the reference numeral 10 and has a mirror 12 covering the opening of a mirror housing 14 and which is supported pivotably in relation to the mirror housing 14. The mirror housing 14 has disposed therein a bracket 15 having fixed thereto a mirror drive unit (not shown) comprising a drive motor to turn the mirror 12 vertically and horizontally as remote-controlled. The mirror housing 14 is pivotably mounted on a shaft 20 fixed with a screw 18 to a mirror base 16 which is to be fixed to a car body 17 (FIG. 1). Namely, the bracket 15 inside the mirror housing 14 has formed thereon coaxially with the shaft 20 a cylindrical portion 22 of which the inner diameter is slightly larger than the outer diameter of the shaft 20 and in which the shaft 20 is fitted. The shaft 20 has fitted thereon and disposed at the base portion thereof a ring 24 which is also positioned in contact with the lower opening edge of the cylindrical portion 22 to form a thrust bearing. Also, the cylindrical portion 22 has formed in the lower inner circumferential wall thereof a circular recess being somewhat larger than the inner diameter of the cylindrical portion 22 and which houses an O-ring 26 which is in contact with the outer circumferential surface of the shaft 20 and the inner circumferential wall of the cylindrical portion 22. There is disposed a slide bearing 28 above the O-ring 26 and between the shaft 20 and cylindrical portion 22.

Such drive mechanism to turn about the shaft 20 and the mirror housing 14 supported pivotably with respect to the shaft 20, comprises a motor 30 fixed to the bracket 15 inside the mirror housing 14, reduction gears 32 coupled to the output shaft of the motor 30, a first spur gear 34 connected to the output shaft of the reduction gears 32, and a second spur gear 36 in mesh with the first spur gear 34 and mounted on the shaft 20 as checked against any rotation, and which is axially movable.

When the mirror housing 14 is to be rotated as the motor 30 runs, the revolution of the motor 30 is transmitted to the first spur gear 34 by means of the reduction gears 32. The second spur gear 36, in mesh with the first spur gear 34, is mounted on the shaft 20 as checked against any rotation, namely, the second spur gear 36 has formed in the center thereof an elongated hole of which the shape fits the circumference of the shaft 20 partially cut so as to have two opposite flat surfaces parallel to the axis of the shaft 20 above the top end of the cylindrical portion 22, so the first spur gear 34 moves around the second spur gear 36 as it rotates. There is provided a ring 38 between the second spur gear 36 and the top end of the cylindrical portion 22. The shaft 20 has a spring seat 42 fixed near the top end thereof, and there is interposed between the spring bearing 42 and the second spur gear 36 a compression coil spring 40 which forces the ring 38 to the top end of the cylindrical portion 22. The ring 38 forms a thrust bearing which lessens the friction between the top end of the cylindrical portion 22 and the mirror housing 14 when the latter rotates about the shaft 20. Thus, the ring 38 does not block the rotation of the mirror housing 14. The first spur gear 34 in mesh with the second spur gear 36, forms a clutch together with a holder 46. As will be described later, a portion of the output shaft 44 of the reduction gears 32 is shaped hexagonally. The holder 46 is fitted on the hexagonal portion and rotates along with the output shaft 44. The holder 46 is axially movable. The first spur gear 34 is fitted on the output shaft 44 of the reduction gears 32 and forced to the holder 46 by a compression coil spring 35 interposed between the first spur gear 34 and the casing of the reduction gears 32. The end of the hexagonal portion of the output shaft 44 on which the holder 46 is fitted is fixed to a seat member 48 loose-fitted in a small hole formed in the bracket 15. There is interposed between the bottom face of the holder 46 and the seat member 48 a push nut 50 positioned for the first spur gear 34 to be in mesh with the second spur gear 36. Thus, when the mirror housing 14 is turned as the motor 30 runs, the first spur gear 34 is forcibly pressed to the holder 46 by means of the compression coil spring 48, clutches the holder 46 and rotates along with the latter. When the mirror housing is turned by hand to the folded position, the first spur gear 34 is disengaged from the holder 46 and becomes freely rotatable about the output shaft 44. The reference numeral 60 indicates a circular recess formed in the flat base portion of the shaft 20 around the axis of the latter. The circular recess 60 is formed in a position corresponding to the folded and used positions of the mirror housing 14. The bracket 15 has formed therein a space housing a compression coil spring 64 and a ball 66. The ball 66 is forced to the flat base portion of the shaft 20 by means of the compression coil spring 64 and resiliently engaged in the recess 60 when the mirror housing 14 is placed in the folded position or normal position.

Figure 2:
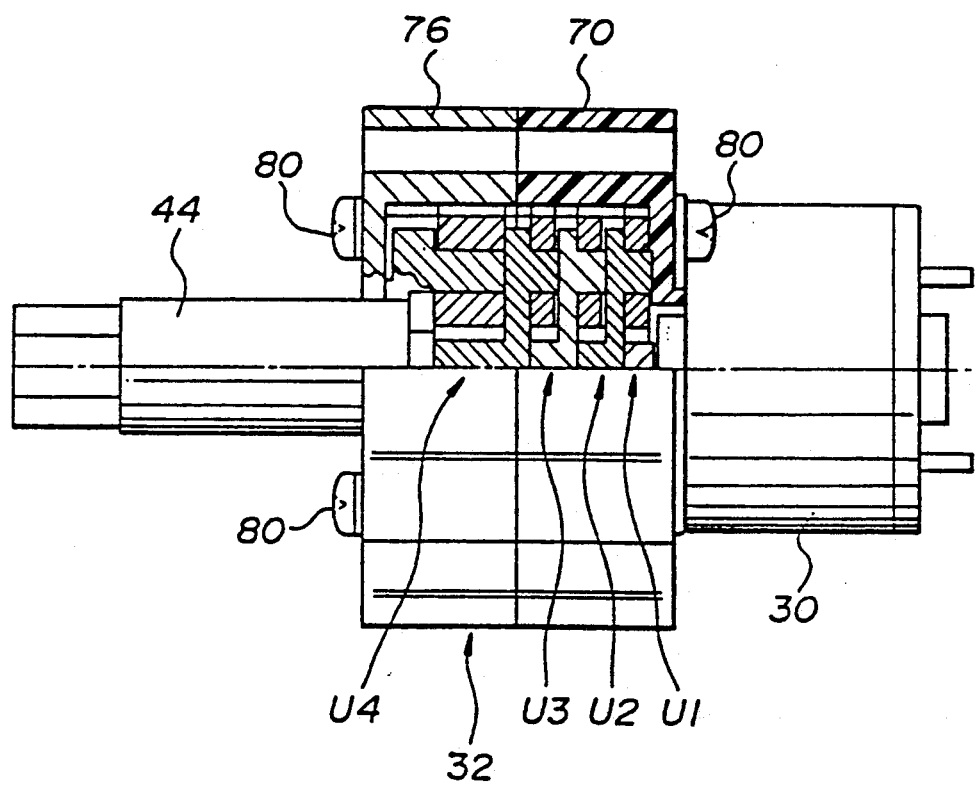
FIG. 2 is a partially sectional front view of the planet gear speed reducer forming a part of the drive mechanism shown in FIG. 1.
Figure 3:
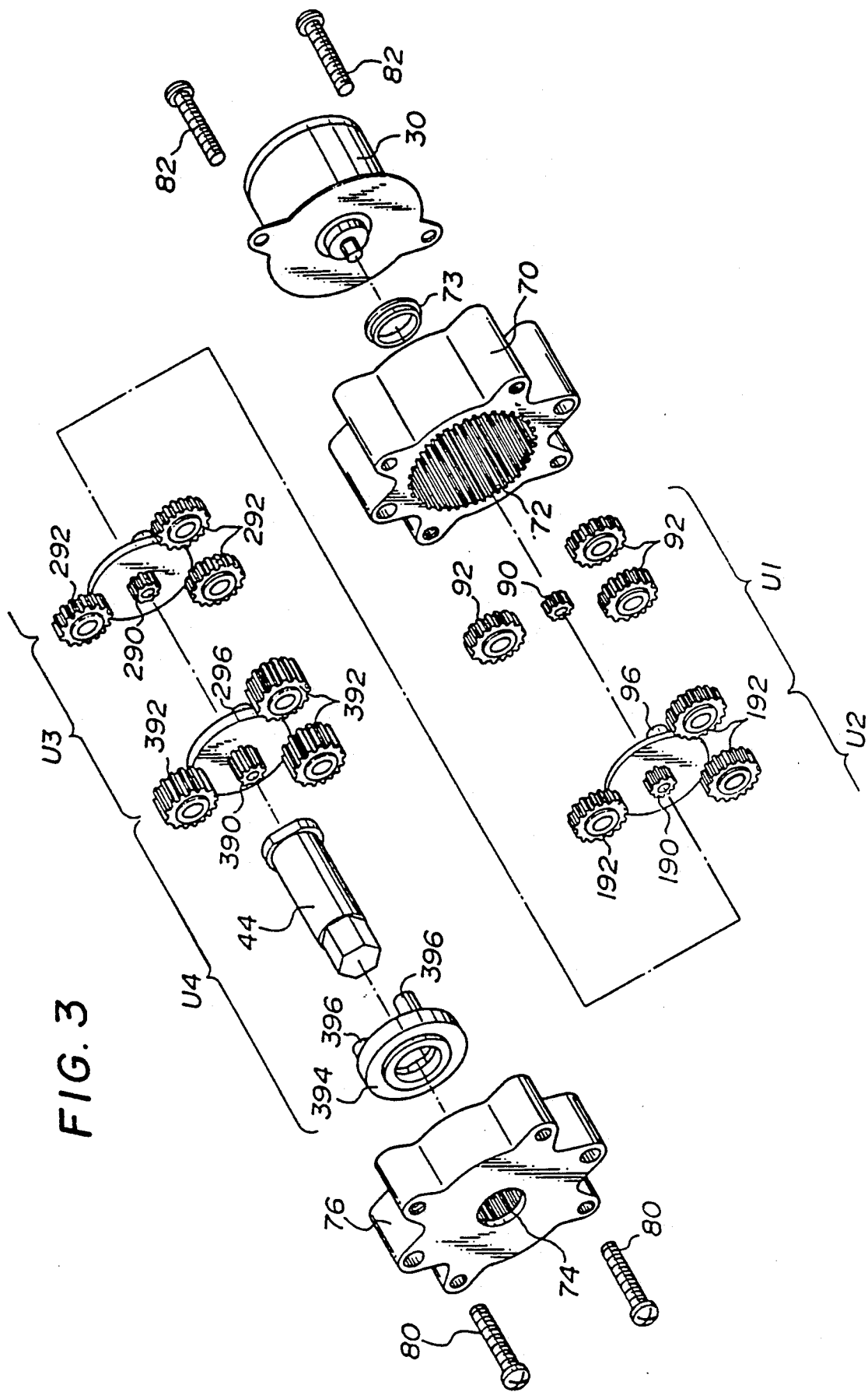
FIG. 3 is a schematic perspective exploded view (enlarged in scale) of the planet gear speed reducer.
Figure 4:
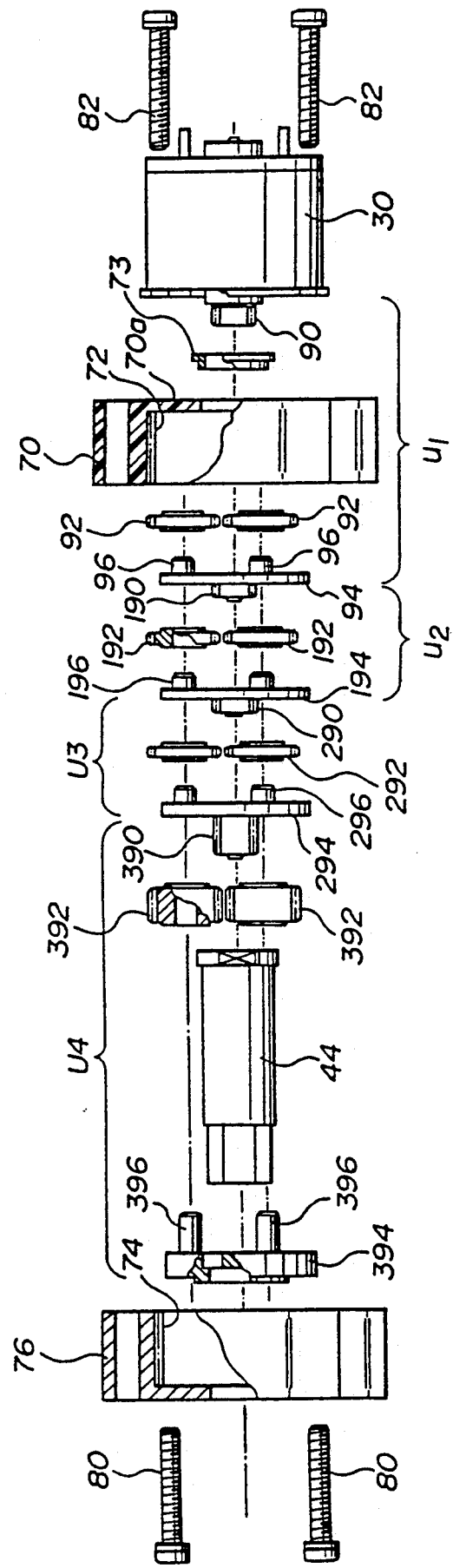
FIG. 4 is a schematic, partially fragmental, exploded view of the planet gear speed reducer.

As shown in FIGS. 2–4, the reduction gears 32 composing the drive unit for a side-view mirror assembly of a motor-driven folding type is composed of four planetary gear units U1, U2, U3 and U4. FIG. 3 shows the planetary gear units U1, U2 and U3 housed in a casing 70 having formed in the inner cylindrical wall thereof a ring gear 72 common to these three planetary gear units, while the planetary gear unit U4 is housed in another casing 76 having another ring gear 74 formed in the inner wall thereof. The ring gears 72 and 74 are so formed as to have a same pitch circle diameter and they are jointed to each other with plural bolts 80 with the specified planetary gear units housed therein, respectively, to form the reduction gears or speed reducer 32. Further, the casing 70 has the motor 30 jointed thereto with a bolt 82, and the speed reducer 32 and motor 30 are fixed together by the holder to the bracket 15 inside the mirror housing 46 (which is not shown).

As shown in FIG. 3, the planetary gear unit U1 comprises a sun gear 90 fixed to the output shaft of the motor 30, three planet pinions 92 in mesh with the sun gear 90 as well as with the ring gear 72, and a planet carrier 94 having three protrusions 96 loose-fitted in the respective planet pinions 92 and thus supporting the planet pinions 92. This planetary gear unit U1 decelerates one step and converts the revolution of the motor 30 to a slower rotation of the planet carrier 94 (FIG. 4).

The planetary gear unit U2 similarly comprises a sun gear 190 fixed on the shaft of the planet carrier 94 of the planetary gear unit U1, three planet pinions 192 in mesh with the sun gear 190 as well as with the ring gear 72, and a planet carrier 194 having three protrusions 196 loose-fitted in the respective planet pinions 192 and thus supporting the planet pinions 192 (FIG. 4). This planetary gear unit U2 converts the rotation of the planet carrier 94 to a slower rotation of the planet carrier 194.

Similar to the above planetary gear units, the planetary gear units U3 and U4 comprise a sun gear 290 (390), three planet pinions 292 (392) in mesh with the sun gear 290 (390) as well as with the ring gear 72, and a planet carrier 294 (394) having three protrusions 296 (396) loosely-fitted in the respective planet pinions 292 (392) and thus supporting the planet pinions 292. Planetary gear units U3 and U4 convert the revolution of the motor 30 to a predetermined slow rotation of the last-stage planet carrier 394.

There is disposed as checked against any rotation on the shaft of the planet carrier 394 composing the planetary gear unit U4, one end of the output shaft 44 which is to be coupled to the previously-mentioned clutch holder 46 (FIG. 1). The end of the output shaft 44 is shaped in the form of a hexagon. The output shaft 44 is introduced through a hexagonal through-hole (not shown) formed in the clutch holder 46 and the hexagonal end is secured to the seat member 48, the first spur gear 34 is pressed by the compression coil spring 44 toward the clutch holder 46 as loosely-fitted on the body of the output shaft 44.

Each of the ring gear 72, planet gears 90, 190 and 290, and planet pinions 92, 192 and 292 composing the U1 thru U3 planetary gear units has the module selected to be 0.4. The casing 70 having the ring gear 72 formed on the inner circumferential wall thereof is made of nylon 66 containing 30 percent glass by weight, the planet pinion 92 in mesh with the sun gear 90 fixed to the output shaft of the motor 30 is made of a synthetic resin such as polyacetal or the like, and the remainder of the component elements are made of a sintered alloy.

The module of each of the ring gear 74, sun gear 390 and planet pinion 392 composing the planetary gear unit U4 is selected to be 0.5. The casing 76 having the ring gear 74 formed on the inner circumferential wall thereof is made of a zinc die casting and the rest of the component elements are made of a sintered alloy.

In this embodiment, the modules of the ring gears 72 and 74 are selected to be 0.4 and 0.5, respectively. This is because the module of the ring gear 72 can be set small since the load torque of the ring gear 72 at the side of the motor 30 is smaller than that of the ring gear 74 at the output side. Therefore, the number of teeth of the ring gear 72 can be increased provided that the pitch circle diameters of the ring gears 72 and 74 are equal to each other. In the conventional reduction gear system, a plurality of planetary gear units are disposed in a single die casting-made casing having formed therein a ring gear common to the planetary gear units. The module of the ring gear is determined depending upon the load torque at the output side. Thus, it is not possible to freely design the reduction ratio. However, the planetary gear mechanism forming the drive mechanism according to the present invention adopts such a structure of the casing in which a ring gear is formed and is split into two parts along a plane perpendicular to the axis of the casing. The sub-casing at the motor side has disposed therein three planetary gear units, while the sub-casing at the output side has one planetary gear unit disposed therein. The modules of the two ring gears 72 and 74 can be determined depending upon the load torque at the motor side and that at the output side, respectively. Thus, a larger reduction ratio can be achieved. The planetary gear units can be assembled into the respective casings very easily and the rigidity of the gears can be designed more freely.

Figure 5:
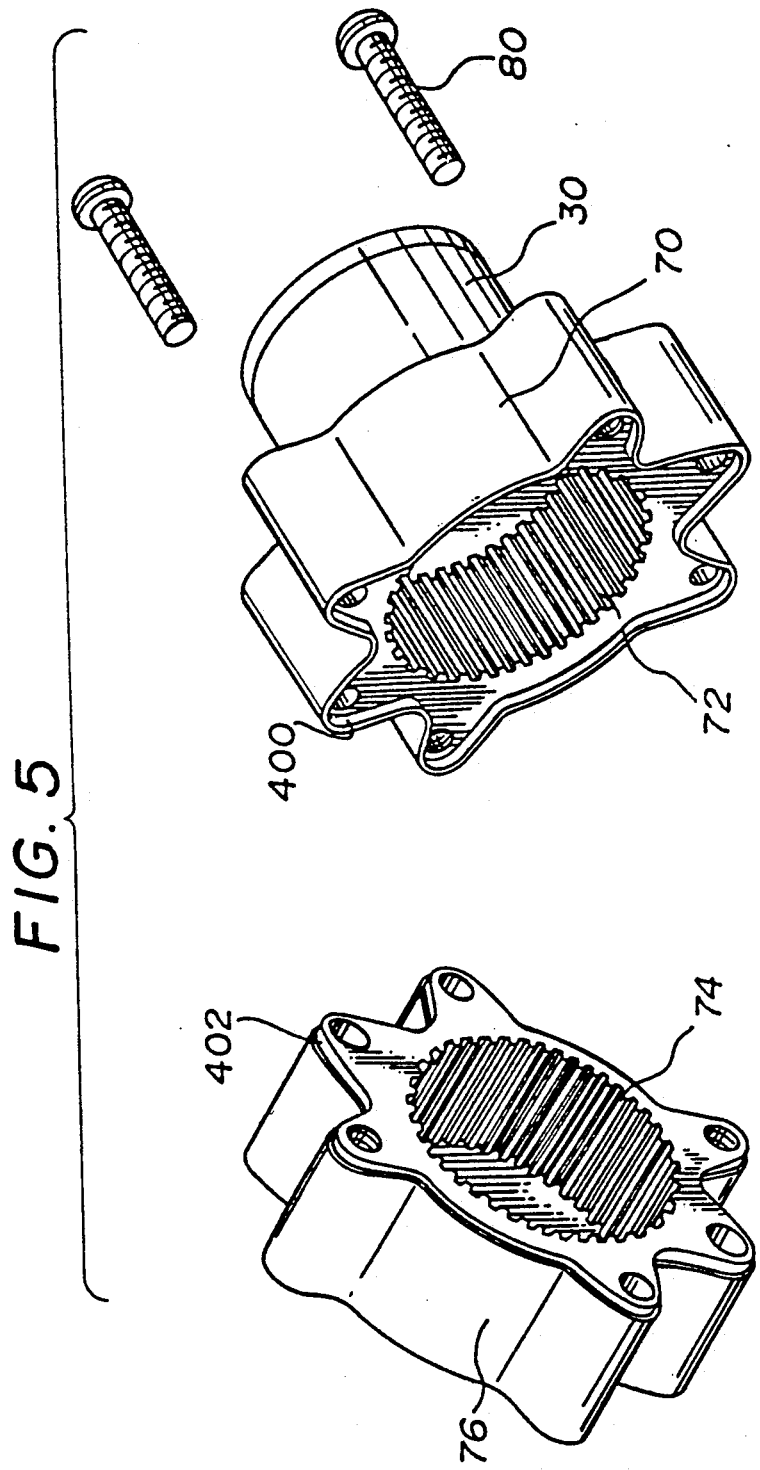
FIG. 5 is a schematic exploded view of the planet gear speed reducer, showing the faucet joint of the two casings.

FIG. 5 shows a variant of the planetary gear mechanism which provides for easy and accurate positioning of the casings 70 and 76. The casings 70 and 76 are jointed to each other by a faucet joint. Namely, the edge of the end face of the casing 70 in which the ring gear 72 is formed is jointed to the casing 76, extended axially of the casing 70. The extension rim 400 thus made and the joining end face of the casing 70 define together a space receiving the end of the casing 76. The inner end of the casing 76 is so formed as to receive the extension rim 400 of the casing 70. When the casings 70 and 76 are coupled together, the outer circumferential receiving edge of the casing 76 fits the inner circumferential wall of the extension rim 400 of the casing 70. After the planetary gear units U1 to U3 are housed in the casing 70 while the planetary gear unit U4 is placed into the casing 76, the casings 70 and 76 can be easily coupled with their axes aligned to each other owing to the abovementioned faucet joint system. Namely, the faucet joint permits easy and accurate positioning of the casings 70 and 76.

In the foregoing embodiments, the planetary gear units U1, U2 and U3 are housed in the casing 70 at the side of the motor 30, while the planetary gear unit U4 is housed in the casing 76 at the output side. However, the present invention is not limited to this configuration. Instead, the planetary gear units U1 and U2 may be housed in the casing 70 while the planetary gear units U3 and U4 be housed in the casing 76. Also, the casings 70 and 76 having ring gears formed therein, respectively, are made of different materials in the aforementioned embodiments, but they may be made of a zinc die casting or a synthetic resin.

What is claimed is:

1. A drive mechanism for a side-view mirror assembly of the motor-driven folding type comprising:
   an electric motor to pivot between a normal and a folded position a mirror housing pivotably supported on a shaft fixed to a mirror base which is to be fixed to a car body;
   a speed reducer comprising a plurality of planetary gear units including a sun gear coupled to an output shaft of said motor, and;
   a transmission gear group including at least a first spur gear fixed on said motor shaft and a second spur gear connected to an output shaft of said speed reducer and which is in mesh with said first spur gear,
   said speed reducer comprising a first cylindrical casing, housing coaxially some of said plurality of planetary gear units including at least the planetary gear unit including said sun gear coupled to the output shaft of said motor and which has formed on the inner circumferential wall thereof a first ring gear common to said some planetary gear units, a second cylindrical casing, housing coaxially the remaining plurality of planetary gear units so as to be in mesh with said some planetary gear units of the first cylindrical casing and has formed on the inner circumferential face thereof a second ring gear common to said remaining planetary gear units, and a means for coupling together said first and second casings,
   said first and second ring gears being formed with different gear modules such that the first ring gear formed in said first casing is formed with a smaller gear module than that of the second ring gear formed in said second casing.

2. A drive mechanism for a side-view mirror assembly of the motor-driven folding type comprising:
   an electric motor to pivot between a normal and a folded position a mirror housing pivotably supported on a shaft fixed to a car body;
   a speed reducer comprising a plurality of planetary gear units including a sun gear coupled to an output shaft said motor, and;

said speed reducer comprising a first cylindrical casing, housing coaxially some of said plurality of planetary gear units and which has formed on the inner circumferential wall thereof a first ring gear common to said some planetary gear units, a second cylindrical casing, housing coaxially the remaining planetary gear units so as to be in mesh with said some planetary gear units and has formed on the inner circumferential face thereof a second ring gear common to said remaining planetary gear units, and a means for coupling together said first and second casings;

said first and second ring gears being formed with different gear modules wherein the gear module of said first ring gear is dependent upon a load torque at said motor output shaft, and the gear module of said second ring gear is dependent upon a greater load torque at said output shaft of the speed reducer.

3. A drive mechanism according to claim 2, wherein said first casing houses at least the planetary gear unit including said sun gear coupled to the output shaft of said motor and the first ring gear formed in said first casing is formed with a smaller gear module than that of the second ring gear formed in said second casing.

4. A drive mechanism according to claim 3, wherein said first casing is made of a synthetic resin while said second casing is made of die casting.

5. A drive mechanism according to claim 2, wherein the opening ends of said first and second casings have faucet joints formed thereon, respectively.

6. A drive mechanism for a side-view mirror assembly of a motor-driven folding type comprising:

an electric motor to pivot between a normal and a folded position a mirror housing pivotably supported on a shaft fixed to a mirror base which is to be fixed to a car body;

a speed reducer comprising a plurality of planetary gear units including a sun gear coupled to an output shaft of said motor, and;

said speed reducer comprising a first cylindrical casing, housing coaxially some of said plurality of planetary gear units and which has formed on the inner circumferential wall thereof a first ring gear common to said some planetary gear units, a second cylindrical casing housing coaxially the remaining plurality of planetary gear units so as to be in mesh with said some planetary gear units and has formed on the inner circumferential face thereof a second ring gear common to said remaining planetary gear units, and a means for coupling together said first and second casings, and wherein said first casing is made of a synthetic resin and said second casing is made of a die casting.

7. A drive mechanism according to claim 6, wherein said first and second ring gears are formed with different gear modules.

8. A drive mechanism according to claim 7, wherein said first casing houses at least the planetary gear unit including said sun gear coupled to the output shaft of said motor and the first ring gear is formed with a smaller gear module than that of the second ring gear.

9. A driven mechanism for a side-view mirror of a motor-driven folding type comprising:

an electric motor to pivot between a normal and a folded position a mirror housing pivotably supported on a shaft fixed to a mirror base which is to be fixed to a car body;

a speed reducer comprising a plurality of planetary gear units including a sun gear coupled to an output shaft of said motor, and;

a transmission gear group including at least a spur gear fixed on said motor shaft and another spur gear coupled to an output shaft of said speed reducer and which is in mesh with said first spur gear, said speed reducer comprising a first cylindrical casing, housing coaxially some of said plurality of planetary gear units and which has formed on the inner circumferential wall thereof a first ring gear common to said some planetary gear units, a second cylindrical casing, housing coaxially the remaining plurality of planetary gear units so as to be in mesh with said some planetary gear units in the first casing and has formed on the inner circumferential face thereof a second ring gear common to said remaining planetary gear units and a means for coupling together said first and second casings, said first and second ring gears being formed with different gear modules, and wherein said some plurality of planetary gear units are arranged in said first casing so as to provide a higher gear reduction ratio and said remaining plurality of said planetary gear units are arranged in said second casing so as to be adapted to the greater torque at said output shaft of the speed reducer.

10. A drive mechanism according to claim 9, wherein said first casing houses at least the planetary gear unit including said sun gear coupled to the output shaft of said motor and the first ring gear formed in said first casing is formed with a smaller gear module than that of the second ring gear formed in said second casing.

11. A drive mechanism according to claim 9, wherein said first casing is made of a synthetic resin while said second casing is made of a die casting.

12. A drive mechanism according to claim 9, wherein the opening ends of said first and second casings have faucet joints formed thereon, respectively.

* * * * *